June 28, 1927.
G. F. COLLEY
1,633,695
STEERING GEAR CENTERING DEVICE
Filed July 30, 1925
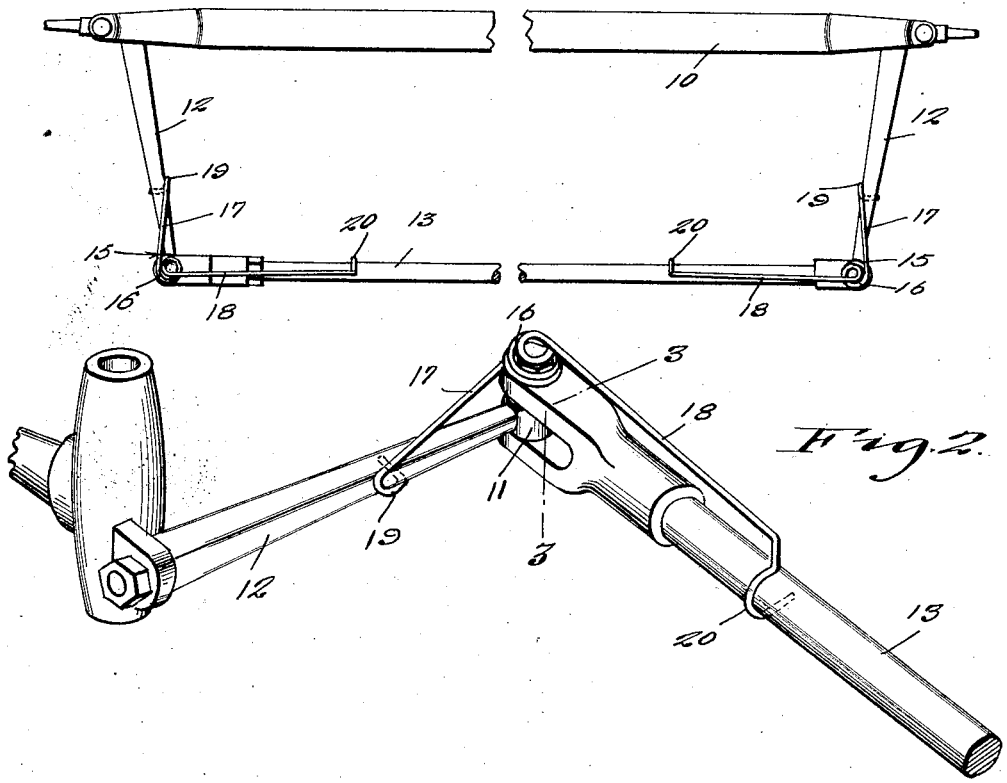
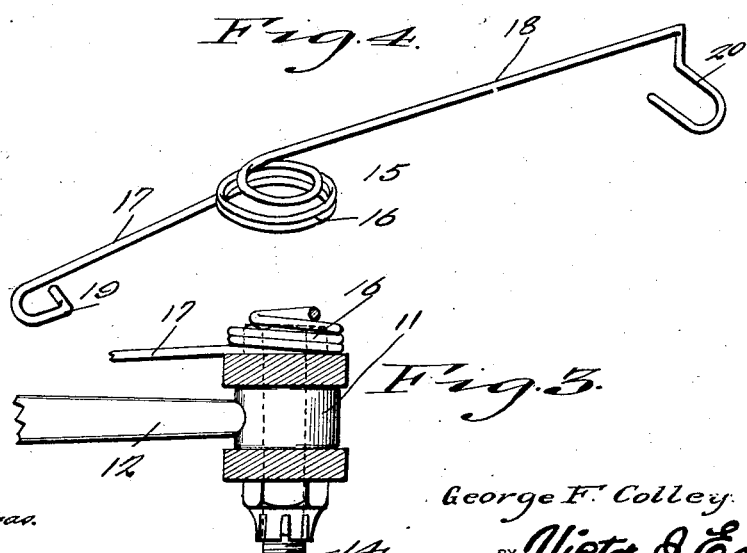
George F. Colley, INVENTOR
BY Victor J. Evans ATTORNEY

Patented June 28, 1927.

1,633,695

UNITED STATES PATENT OFFICE.

GEORGE F. COLLEY, OF RICHMOND, VIRGINIA, ASSIGNOR TO HUGH H. WEEDON, OF RICHMOND, VIRGINIA.

STEERING-GEAR-CENTERING DEVICE.

Application filed July 30, 1925. Serial No. 47,129.

This invention relates to improvements in steering mechanisms for automobiles and has for an object the provision of means capable of being readily attached to the steering mechanism to yieldingly direct the steering wheels in a straightforward position and to tend to return the said wheels to such position after the automobile has been turned, so that the driver will be assisted in straightening out his wheels.

With the above and other objects in view, the invention further includes the following novel features and details of construction, to be hereinafter more fully described, illustrated in the accompanying drawings and pointed out in the appended claim.

In the drawings:—

Figure 1 is a fragmentary plan view illustrating a portion of the steering mechanism of an automobile with the invention applied.

Figure 2 is a fragmentary perspective view.

Figure 3 is an enlarged sectional view taken substantially on the line 3—3 of Figure 2.

Figure 4 is a detail perspective view of one of the springs.

Referring to the drawings in detail wherein like characters of reference denote corresponding parts, the reference character 10 indicates the front axle of an automobile, 11 the steering knuckle, 12 the steering knuckle arms and 13 the steering knuckle connecting rod whose opposite ends are pivotally secured to the ends of the steering knuckle arms 12 by bolts 14.

In one well known make of automobile there is a tendency of the steering wheels to be deflected or turned from their course when traveling upon one side of the crown of a road, or when the wheels strike an obstruction. This renders the mechanism dangerous as it sometimes jerks the steering wheel from the hand of the driver and the latter loses control of the machine.

The present invention overcomes this and other disadvantages by yieldingly resisting tendency of the front wheels of the automobile to travel other than in a direct forward path, so that should the steering wheel be jerked from the hands of the driver, the front wheels will automatically return to a direct forward position, while the tendency of the wheels will be to straighten out after the vehicle has made a turn.

To accomplish this, the invention provides a spring 15, one of which is adapted to be located at each end of the steering knuckle connecting rod. This spring comprises an intermediate coiled portion 16 which is substantially cone shaped, that is, the uppermost coil is of less diameter than the lowermost coil. By forming the coiled portion 16 of the spring substantially conical, this portion will engage over the head of the bolt 14 and will hold the bolt in place in the event of the loss of its nut. This portion of the spring further provides a cap which fits over the head of the bolt and forms a fulcrum or mounting for the coil. Extending from the coil are arms 17 and 18, the former being provided with a hook 19 which engages the steering knuckle arm, while the arm 18 is provided with a hook 20 which engages the adjacent end of the rod 13. The hooks 19 and 20 are properly offset to provide for such engagement.

By reference to Figure 1 of the drawings it will be seen that when the steering knuckles are moved to change the direction of travel of the vehicle, one of the springs 15 will be tensioned so that this spring will be stronger than the other spring and movement of the steering knuckles will be thus yieldingly resisted. As the steering action is decreased by the driver, the tendency of the steering wheels will be to return to their normal position so that the front wheels will be directed straight ahead.

The invention is susceptible of various changes in its form, proportions and minor details of construction and the right is hereby reserved to make such changes as properly fall within the scope of the appended claim.

Having described the invention what is claimed is:—

A stabilizing and protecting device for steering gear which gear includes a steering knuckle arm, a connecting rod, and the steering knuckle bolt connecting the arm and rod, which device comprises a substantially conical resilient coil for engagement about and over the head of the said bolt to prevent accidental loss thereof, and resilient arms extending from the coil in opposite directions and having terminal hooks, both, in the normal condition of the device, being presented in the same direction, one of said hooks being engageable with the said rod and the other engageable with the steering knuckle arm.

In testimony whereof I affix my signature.

GEORGE F. COLLEY.